United States Patent [19]

Stumpf et al.

[11] Patent Number: 4,806,373

[45] Date of Patent: Feb. 21, 1989

[54] PROCESS FOR CURING MEAT WITH FRUIT JUICE

[75] Inventors: Robert E. Stumpf, Columbia Station, Ohio; Robert W. Stumpf, 16309 Boone Rd., Columbia Station, Ohio 44028

[73] Assignees: Robert W. Stumpf; Rebecca Fitch, both of Columbiana Station, Ohio ; a part interest

[21] Appl. No.: 150,914

[22] Filed: Feb. 1, 1988

Related U.S. Application Data

[63] Continuation-in-part of Ser. No. 893,216, Aug. 1, 1986, abandoned.

[51] Int. Cl.4 .................................................. A23B 4/00
[52] U.S. Cl. .................................... 426/266; 426/281; 426/641; 426/646
[58] Field of Search ............... 426/265, 266, 281, 641, 426/646, 652, 804, 56, 58, 59

[56] References Cited

U.S. PATENT DOCUMENTS

| 1,165,924 | 12/1915 | Ditchford | 426/56 |
| 2,735,777 | 2/1956 | Meyer | 426/652 X |
| 3,099,566 | 7/1963 | Flesch et al. | 426/266 |
| 3,138,465 | 6/1964 | Naschek | 426/641 X |
| 3,520,701 | 7/1970 | Rendek et al. | 426/646 X |
| 4,183,963 | 1/1980 | Brimelow et al. | 426/321 |
| 4,248,902 | 2/1981 | Eapen et al. | 426/332 |
| 4,254,152 | 3/1981 | Janovtchik | 426/399 |
| 4,384,009 | 5/1983 | Lewis et al. | 426/646 |
| 4,476,112 | 10/1984 | Auersano | 424/127 |

Primary Examiner—Arthur L. Corbin
Attorney, Agent, or Firm—Oldham & Oldham Co.

[57] ABSTRACT

A process is disclosed for curing meat using certain fruit juices or a fruit juice composition. In one embodiment, the process involves the steps of (a) contacting the meat with a curing composition comprising apple juice, grape juice, pear juice, cherry juice, strawberry juice, pineapply juice, and/or peach juice, and (b) curing said meat for an effective period of time to provide a desired cured meat product. In another embodiment of the invention, the process involves the steps of (a) preparing a mixture comprising at least one meat and at least one fruit juice selected from the group consisting of apple juice, pear juice, strawberry juice, pineapple juice, grape juice, and/or peach juice, (b) comminuting said mixture, and (c) curing said mixture for an effective period of time to provide a desired cured meat product acceptable to USDA standards.

14 Claims, No Drawings

PROCESS FOR CURING MEAT WITH FRUIT JUICE

This application is a continuation-in-part of U.S. Ser. No. 893,216 filed Aug. 1, 1986, now abandoned.

TECHNICAL FIELD

This invention relates to a process for curing meat and, more particularly, to a process for curing meat using certain fruit juices. Specifically this invention provides a cured meat containing sufficient fruit juice sweetener of glucose-fructose type to enhance taste and improve the effectiveness of the seasoning and other curing additives.

BACKGROUND OF THE INVENTION

Meat curing involves treating a meat product with addivites such as salt, color-fixing ingredients and seasonings in order to impart desired palletability traits to the meat product. The meat products that can be cured in this manner include intact meat products and comminuted meat products. Intact meat products include bacon, corned beef, ham, smoked butt, pork hocks, chicken, turkey and related meat products. Comminuted meat products include all types of sausage items. Products intermediate to these categories include sectioned meat products, chunked meat products and formed meat products.

Meat curing agents or additives include sodium chloride, sodium and potassium nitrate, sodium and potassium nitrite, sodium ascorbate, sodium erythorbate, phosphates, sugar, seasonings, and the like. The salt content of such cured meats generally varies from about 1 to about 12% by weight depending on the particular type of meat product. Salt is used for flavor, preservation and extraction of myofibrillar protein. Nitrite promotes color development, flavor and preservation by inhibiting the growth of microorganisms and fat oxidation. Erythorbate acts as a color stabilizer, reduces fat oxidation and inhibits undesirable nitrite reactions. Phoshates facilitate myofibrillar protein extraction, inhibit fat oxidation and improve color development. Sugar is used principally for flavor, but also helps set color or develop glazes.

A problem that has occurred with most cured meat products that are currently available is that the level of sugar required to provide desired flavor characteristics in these products renders them unsuitable for diabetics and other consumers requiring low-sugar diets. Additionally, the relatively high levels of salt employed in these products renders many of them unsuitable for consumers restricted to low salt or low sodium diets. Anyway the sugar does not appear to enhance the effects of other additives.

Although attempts have been made to cure bacon and ham using apple slices in place of sugar during curing, these attempts were not sufficiently satisfactory to the accepted commercially. This dissatisfaction with the attempted cured product may be due to the fact that the absorption of the fruit parts and juices from the apple slices into the meat ws not sufficient to provide satisfactory levels of cur. Anyway these attempts appear to be no more than unsatisfactory experiments with little or no enhancement of the effects of the other additives.

DISCLOSURE OF THE INVENTION

In one embodiment, the present invention provides for a process for curing meat comprising (a) contacting said meat with a curing composition comprising apple juice, pear juice, cherry juice, strawberry juice, pineapple juice and/or peach juice, and (b) curing said meat for an effective period of time to provide a desired cured meat product. In another embodiment, the invention provides a process for curing comminuted meat products and the like comprising the steps of (a) preparing a mixture comprising at least one meat and at least one fruit juice selected from the group consisting of apple juice, pear juice, strawberry juice, pineapple juice, and/or peach juice, (b) comminuting said mixture, and (c) curing said mixture for an effective period of time to provide a desired cured meat product.

The meat products produced by this process are sweetened by the fruit juice and thus do not contain cane, beet or related sugars such as sucrose and the like which are harmful to diabetics and other persons on low sugar diets. The sweetness is due to monosaccharides of glucose and fructose. An unexpected advantage with this invention is that by virtue of the use of the indicated fruit juices in the curing composition, sodium chloride is not needed to provide desired taste characteristics; when sugars such as sucrose and the like are used, additional salt is required to offset the sweetness imparted by such sugars. Thus, the meat products made in accordance with the invention can have significantly reduced levels of salt when compared to meat products made with conventional processes using sugars such as sucrose and the like. Thus, the fruit juice appears to enhance the effect of the other additives.

BEST MODE FOR CARRYING OUT THE INVENTION

The term "meat" as used herein is to be understood as meaning all raw flesh of animal origin including sea food that are customarily used as food. Included within this group are intact meat products, comminuted meat products, sectioned meat products, sectioned meat products, chunked meat products, formed meat products, and the like. Examples include bacon, smoked beef, corned beef, ham, cottage ham, Canadian bacon, smoked cottage butt, pork loin, rib, smoked chicken, smoked turkey, chunke or formed hams, roasts, steaks, sausage, smoked shrimp, smoked salmon, smoked sturgeon, and the like.

The term "juice" as used herein encompasses natural fruit juices as well as concentrated and diluted forms of fruit juice. Thus the juice may be single strength to concentrates of 5 to 6 strengths. These juices may be decolorized, deionized, deacidized and the fruit acids may vary from about a pH of 5 to 2.5, 3 or 4.

The curing compositions employed in accordance with one embodiment of the inventive process comprises apple juice, pear juice, cherry juice, strawberry juice, pineapple juice and/or peach juice. Apple juice is preferred. These juices can be in their natural state, or they can be diluted or concentrated. Decolorized and unflavored grape juice or pineapple juice have certain advantages of high brix content. The apple juice is preferably pure, unsweetened apple juice.

The curing compositions besides the fruit juice can also contain water and other stndard ingredients typically contained in curing formulations such as sodium or potassium nitrate, sodium or potassium nitrite, sodium chloride, sodium ascorbate, sodium erythorbate, monosodium glutamate, phosphates (e.g., sodium tripolyphosphate, sodium hexametaphosphate), seasonings, etc. These curing compositions preferably contain no sodium chloride or low leverls of sodium chloride (e.g., one-half pound or less of sodium chloride per gallon of fruit juice) but can contain up to about 10% by weight sodium chloride. Nitrites are generally present at levels in the range of from about 10 to about 280 ppm. Sodium ascorbate, sodium erythorbate, monosidum glutamate and the phosphates are optional ingredients but when present can be present at levels in the range of about ⅛ to about 1 ounce per gallon of fruit juice. The curing composition can be in the form of a solution, a water-based mixture or slurry, or a dry mixture may be used. The preferred form depending on the manner in which contact between the curing composition and the meat is effected.

The curing composition is preferably absorbed or impregnated into the meat at levels of up to about 30% by weight, preferably up to about 15% by weight, more preferably up to about 5% by weight, more preferably in the range of about 2% to about 3% by weight based on the weight of the meat prior to contact with the curing composition. Thus cured meat composition with about 2% up to limit permitted by the USDA can be obtained.

Standard procedures known in the art can be used to effect contact between the curing composition and meat. For example, the curing composition can be injected into the meat using standard pumping techniques such as stitch or spray pumping. In stitch or spray pumping, the curing composition enters the meat through numerous perforations in the walls of hollow needles. Multi-needle injectors having fine hollow-stemmed needles arranged in banks which automatically move the needles into the products as they move on conveyor belts can be used. To accelerate the distribution of the curing composition within the product and improve cure uniformity meat products such as boneless hams may be tumbled or massaged after injection.

The curing composition can be applied using dry-curing techniques. In dry-curing the curing composition is rubbed in dry form over the surface of the meat. The meat is then stored and allowed to cure. For large cuts of meat, the curing composition is preferably applied several times. Dry-curing can be used with specialty items such as country-cured hams and bacons.

Comminuted meat may be cured in accordance with this invention by mixing the curing composition with the comminuted meat. The degree of comminution varies considerably from one product to another. Sectioned or chunked and formed products may be composed of particles that weight more than one pound each, whereas finely comminuted meats can be chopped to a paste-like texture of very small particles. Comminution equipment includes grinders, silent cutters, emulsion mills and flaking machines. Blenders, mixers, tumblers or massagers can be used to subject the meat to mechanical action in the presence of the curing composition of the invention. Sodium chloride can be added to the curing composition of the invention to extract the principal myofibrillar protein, myosin, from the muscle. The extracted myosin gels when the comminuted meat is heated to form a matrix which entraps water and fat and binds the meat particles to each other.

Comminution reduces the raw meat material to small meat pieces, chunks, chips or slices. Sausages are comminuted meat products that can be cured in accordance with the invention. The fruit juice particularly favors uniform mixing of sage, pepper, salt, nitrites in the sausage and comminuted product.

Large particles or chunks of meat can be massaged or tumbled in the presence of the curing compositions of the invention. In addition to fruit juice, the curing compositions used in the curing of such large particles or chunks preferably contain an effective amount of sodium chloride and a phosphate (preferably sodium tripolyphosphate or hexametaphosphate) to extract salt-soluble proteins that form a tacky exudate which acts as a heat-set glue to bind the chunks of meat together after cooking. This method can be used to prepared chunked and formed hams, roasts and steaks.

The curing temperature used in accordance with the inventive process ranges from just above the freezing temperature of the meat up to about 100° F., preferably from about 35° F. to about 50° F., more preferably about 40° F. Curing times preferably range up to about 30 days, more preferably from about 10 to about 30 days, more preferably from about 15 to about 25 days, more preferably about 21 days.

Meat products that are cured in accordance with this invention can also be smoked to impart a desired smoke flavor and color. The smoking procedure can be effected concurrently with or subsequent to the curing step of the inventive process. The smoking procedure may also include a drying or cooking cycle, depending on the product. In addition to imparting desired flavor and color characteristics, some phenolic compounds present in smoke provide protection from fat oxidation. It is amazing that the fruit acids, aldehydes and fruit related products in the juice do not react with the phenals and related smoke products to give off offensive odors or taste. Further protection is provided by bacteriostatic effective smoke components along with the drying effect that inhibits bacterial growth on the dried surface. Forced-air smoking chambers with close control of time, temperature and humidity which are known in the art can be used. The processing cycle may include predrying, smoking, cooking, drying and cooling. Smoke can be generated by electrical smoke-heat generators which offer close control over temperatures. Enhanced smoke composition or liquid smoke i.e. usually derived from wood tars, may be used as an atomized spray or regnerated smoke. The smoking chamber can be designed for batch or continuous processes. Alternatively, oil or water-based liquid smoke can be added directly to the meat products as flavoring in lieu of the smoking process. Oil-based liquid smokes are preferably used when the meat product is sensitive to low pH of water-based liquid smokes and to insure penetration of the smoke components into the fat phase.

The cured meat products produced in accordance with the inventive process can be stored under cool or frozen conditions using standard refrigeration techniques. These products can be stored frozen for up to about one year. Anyway the cured fruit juice meat product has enhanced resistance to development of the freeze taste.

The following examples disclose exemplary curing compositions and techniques within the scope of the invention. Unless otherwise indicated, n the following examples as well as throughout the entire specification and in the appended claims, all parts and percentages are by weight and all temperatures are in degrees Fahrenheit.

EXAMPLE 1

A curing composition is prepared by dissolving 24 pounds of sodium chloride and 0.48 pound of sodium nitrite in 48 gallons of pure, unsweetened apple juice.

EXAMPLE 2

A curing composition is prepared by dissolving 24 pounds of sodium chloride and 0.72 pound of sodium nitrite in 48 gallons of pure, unsweetened apple juice.

EXAMPLE 3

Sausage is prepared from the following mixture:
100 pounds lean pork
apple juice containing
4 ounces black pepper
4 ounces ground caraway
2 ounces coriander
1.5 pounds sodium chloride
0.024 ounce sodium nitrite The mixture is ground using a standard 3/16-inch plate die and then mixed for 10-15 minutes and placed in a 38 millimeter casing. The encased products is smoked for 4 hours, the internal temperature reaching 155° F. The product is then chilled to 80° F. using water, and stored at 40° F. for 12 hours to provide the desired product having enhanced flavor and spiceness.

EXAMPLE 4

100 pounds of fresh ham are injected with 15 pounds of the curing solution of Example 2. Injection is accomplished using a "pickle-injector" using standard techniques. The injected ham is stored at a temperature of 38°-40° F. for 7-10 days. The bones and fat are removed, and the meat is placed in a netting. The netted meat is smoked for 14 hours at 145° F. using wood chips. It is amazing to learn the acids and related organics of the juice did not produce a deleterious effect with the smoke.

EXAMPLE 5

Example 4 is repeated with the exception that the bone in the ham is not removed.

EXAMPLE 6

Bacon is made by first removing the rib to provide 100 pounds of rib belly. The skin is then removed using a conventional skinning machine. Three pounds of the curing composition of Example 1 are mixed with the meat in a meat massager and maintained therein for 10 days at a temperature of 40° F. The agitatr in the meat massager is activated for 10 minutes each day to enhance the contact of the curing composition with the meat. The meat is removed from the meat massager. Excess fat is trimmed. The meat is smoked for 36 hours, the internal temperature reaching 140° F. The meat is then chilled to 42° F. to provide the final product.

EXAMPLE 7

Example 6 is repeated with the exception that prior to smoking, the meat is dipped in dehydrated apple chips to provide a crust.

While the invention has been explained in relation to its preferred embodiments, it is to be understood that various modifications thereof will become apparent to those skilled in the art upon reading this specification. Therefore, it is
to be understood that the invention disclosed herein is intended to cover such modifications as fall within the scope of the appended claims.

What is claimed is:

1. A process for curing meat comprising:
contacting said meat with a curing compcsition comprising at least one juice selected from the class consisting of apple juice, pear juice, cherry juice, strawberry juice, pineapple juice, and/or peach juice, said apple juice being other than vinegar, said contact occurring for a sufficient period of time for said curing composition to be absorbed by said meat and to provide a cured meat product having enhanced taste.

2. The process of claim 1 wherein said curing composition further comprises at least one nitrite.

3. The process of claim 1 wherein said curing composition further comprises sodium chloride, sodium nitrite and/or potassium nitrite.

4. The process of claim 1 wherein said curing composition is injected into said meat.

5. The process of claim 1 wherein step (b) is carried out at a temperature in the range of just above the freezing temperature of said meat up to about 100° F.

6. The process of claim 1 wherein said meat is cured for up to about 30 days.

7. The process of claim 1 wherein said meat is smoked during or subsequent to step (b).

8. The process of claim 1 wherein said meat is an intact meat product, comminuted meat product, sectioned meat product, chunked meat product or formed meat product.

9. The process of claim 1 wherein said meat product is selected from the class consisting of bacon, smoked beef, corned beef, ham, cottage ham, Canadian bacon, smoked cottage butt, pork loin, rib, smoked chicken, smoked turkey, chunked or formed ham, roast, steak, sausage, smoked shrimp, smoked salmon or smoked sturgeon.

10. The process of claim 1 wherein said meat is contacted with up to about 30% by weight of said composition, said weight being bsed on the original weight of said meat.

11. The process of claim 1 wherein said curing composition comprises apple juice.

12. A process for preparing comminuted meat products comprising the steps of
(a) preparing a mixture comprising at least one meat and a curing coposition comprising at least one fruit juice selected from the fruit consisting of apple, pear, strawberry, pineapple, and/or peach fruit in an amount to effect flavor of the meat, the apple juice being other than vinegar,
(b) comminuting said mixture, and
(c) curing said mixture for a sufficient period of time for said curing composition to be absorbed by said meat and to provide a cured meat product.

13. The process of claim 13 wherein said cured meat is sausage.

14. The process of claim 13 wherein said juice is apple juice.

* * * * *